(12) United States Patent
Kalata

(10) Patent No.: US 11,178,921 B2
(45) Date of Patent: Nov. 23, 2021

(54) PEDESTRIAN REFLECTIVE KIT

(71) Applicant: Rose Kalata, Chicago, IL (US)

(72) Inventor: Rose Kalata, Chicago, IL (US)

( * ) Notice: Subject to any disclaimer, the term of this patent is extended or adjusted under 35 U.S.C. 154(b) by 123 days.

(21) Appl. No.: 16/680,113

(22) Filed: Nov. 11, 2019

(65) Prior Publication Data

US 2021/0137182 A1  May 13, 2021

(51) Int. Cl.
| | | |
|---|---|---|
| *A41D 13/01* | (2006.01) | |
| *A01K 13/00* | (2006.01) | |
| *G08B 5/00* | (2006.01) | |

(52) U.S. Cl.
CPC ............ *A41D 13/01* (2013.01); *A01K 13/006* (2013.01); *G08B 5/004* (2013.01)

(58) Field of Classification Search
CPC .... A41D 13/01; A41D 2200/10; A41D 20/00; G08B 5/00; G08B 5/004; A01K 13/00; A01K 13/007; A01K 13/006; A41F 9/002
USPC .............................................................. 2/69
See application file for complete search history.

(56) References Cited

U.S. PATENT DOCUMENTS

| | | | | |
|---|---|---|---|---|
| 1,483,192 A | * | 2/1924 | Langgons ................ | A41F 9/002 2/338 |
| 2,006,504 A | * | 7/1935 | Johnson .................. | G08B 5/004 359/519 |
| 2,009,325 A | * | 7/1935 | Sachs ....................... | A41F 9/002 2/301 |
| 2,199,996 A | * | 5/1940 | Hobson .................... | G02B 5/08 359/519 |
| 2,276,592 A | * | 3/1942 | Reitman ................. | G08B 5/004 359/519 |
| 2,288,313 A | * | 6/1942 | Buchsbaum ............ | A41F 9/002 2/338 |
| 2,396,080 A | * | 3/1946 | Bruegger ............... | G08B 5/004 359/519 |

(Continued)

FOREIGN PATENT DOCUMENTS

| | | | | |
|---|---|---|---|---|
| CA | 2190398 A1 | * | 5/1998 | ............ A01K 13/00 |
| CH | 710788 B1 | * | 6/2018 | .......... A41D 13/005 |

(Continued)

OTHER PUBLICATIONS

Wells, Kaitlyn, "The Best Dog Boots", Nov. 12, 2018, NY Times, Wirecutter, https://www.nytimes.com/wirecutter/reviews/best-dog-boots/, pp. 1-29. (Year: 2018).*

(Continued)

*Primary Examiner* — Heather Mangine

(57) ABSTRACT

A pedestrian reflective kit includes a waist belt that is wearable around a user's waist. The waist belt is extended through the sleeve and the sleeve is comprised of a light reflecting material to enhance visibility of the user in a darkened environment. A head band is wearable around the user's head. A pair of arm sleeves is provided and each of the arm sleeves is wearable around a respective one of the user's arms. Each of the arm sleeves is comprised of a light reflecting material to enhance visibility of the user in the darkened environment. A pair of ankle bracelets is each of the ankle bracelets is wearable around a respective one of the user's ankles. Each of the ankle bracelets is comprised of a light reflecting material to enhance visibility of the user in the darkened environment.

4 Claims, 5 Drawing Sheets

(56) References Cited

U.S. PATENT DOCUMENTS

| | | | | |
|---|---|---|---|---|
| 2,502,535 A * | 4/1950 | Richards | G08B 5/004 | 359/519 |
| 3,038,381 A * | 6/1962 | Jones | G08B 5/004 | 359/518 |
| 3,371,351 A * | 3/1968 | Allain | A41F 9/002 | 2/338 |
| 3,837,007 A * | 9/1974 | Girest | A41D 27/10 | 359/519 |
| 3,849,804 A * | 11/1974 | Rakow | A41D 13/01 | 359/518 |
| 3,901,579 A * | 8/1975 | Demerest | A41D 13/01 | 359/519 |
| 3,994,560 A * | 11/1976 | Rice | G08B 5/004 | 359/516 |
| 4,365,354 A * | 12/1982 | Sullivan | A41D 13/01 | 2/171 |
| 4,458,431 A * | 7/1984 | Sinclair | A43B 11/00 | 36/111 |
| 4,517,685 A * | 5/1985 | Lesley | A41D 13/01 | 359/518 |
| 4,543,672 A * | 10/1985 | Levy | A41F 9/002 | 2/321 |
| 4,601,538 A * | 7/1986 | Valkenburg | G08B 5/004 | 359/519 |
| D302,136 S * | 7/1989 | Muller | D10/111 | |
| 5,169,702 A * | 12/1992 | Schell | A01K 27/006 | 119/858 |
| 5,193,026 A * | 3/1993 | Purvis | G02B 5/12 | 359/516 |
| 5,245,516 A * | 9/1993 | de Haas | A41D 13/01 | 362/108 |
| D346,482 S * | 5/1994 | Merrill | D2/627 | |
| 5,575,044 A * | 11/1996 | Zornes | A41F 9/002 | 24/168 |
| 5,624,065 A * | 4/1997 | Steffe | A41D 13/01 | 2/312 |
| 5,829,056 A * | 11/1998 | Hubert | A41D 13/01 | 2/48 |
| 6,007,211 A * | 12/1999 | Cheung | A43B 3/001 | 362/103 |
| 6,059,414 A * | 5/2000 | Tsai | A41D 13/01 | 359/516 |
| 6,085,698 A * | 7/2000 | Klein | A41D 13/01 | 119/859 |
| 6,253,384 B1 * | 7/2001 | Valentino | A41F 9/00 | 2/229 |
| 6,339,848 B1 * | 1/2002 | Mayhood | A41F 9/002 | 2/338 |
| 6,470,832 B1 * | 10/2002 | Peacock | A01K 13/007 | 119/850 |
| 6,526,920 B1 * | 3/2003 | Griffin | A01K 13/007 | 119/850 |
| 6,701,532 B1 * | 3/2004 | Glassberg | A41D 20/00 | 2/170 |
| 7,011,427 B1 * | 3/2006 | Baez | G08B 5/004 | 362/191 |
| 7,455,418 B1 * | 11/2008 | Graham | A41D 20/00 | 362/103 |
| 7,950,072 B1 * | 5/2011 | Hanson | A41F 9/002 | 2/338 |
| 7,980,203 B1 * | 7/2011 | Rubottom | A01K 27/006 | 119/858 |
| 8,468,658 B1 * | 6/2013 | Rife | A41F 9/002 | 24/306 |
| 8,613,114 B1 * | 12/2013 | Olivares Velasco | A41D 31/125 | 2/411 |
| D753,344 S * | 4/2016 | Kantor | D29/101.1 | |
| 10,028,486 B1 * | 7/2018 | Kath | A01K 13/001 | |
| D862,001 S * | 10/2019 | Mayster | D30/146 | |
| 2002/0016985 A1 * | 2/2002 | Kelleher | A41D 13/01 | 2/458 |
| 2002/0023284 A1 * | 2/2002 | Romano | A44C 5/003 | 2/16 |
| 2002/0181104 A1 * | 12/2002 | Gonzales | G08B 5/004 | 359/517 |
| 2003/0135913 A1 * | 7/2003 | Yang | A41F 9/002 | 2/338 |
| 2003/0150043 A1 * | 8/2003 | Koppes | A41D 31/32 | 2/69 |
| 2004/0040068 A1 * | 3/2004 | Silver | A41D 13/0543 | 2/227 |
| 2004/0107480 A1 * | 6/2004 | Ellis | A41D 1/06 | 2/237 |
| 2005/0071907 A1 * | 4/2005 | Atallah | A41D 31/32 | 2/69 |
| 2006/0026731 A1 * | 2/2006 | Qashou | A41D 13/01 | 2/69 |
| 2006/0143772 A1 * | 7/2006 | Feduzi | A62B 99/00 | 2/69 |
| 2006/0187066 A1 * | 8/2006 | Chen | G08B 3/10 | 340/574 |
| 2007/0044734 A1 * | 3/2007 | Maloney | A01K 13/007 | 119/850 |
| 2007/0118950 A1 * | 5/2007 | Hogge | A41D 1/02 | 2/69 |
| 2008/0178363 A1 * | 7/2008 | Blauer | A41D 13/01 | 2/69 |
| 2009/0070967 A1 * | 3/2009 | Gonzalez | A45C 13/30 | 24/16 R |
| 2009/0077717 A1 * | 3/2009 | Luginbuhl | A41D 13/01 | 2/209.13 |
| 2010/0277944 A1 * | 11/2010 | Hurwitz | A45C 13/08 | 362/570 |
| 2011/0185476 A1 * | 8/2011 | Boisseau | A45C 13/1046 | 2/243.1 |
| 2011/0209264 A1 * | 9/2011 | Williams | A41D 31/18 | 2/69 |
| 2012/0060263 A1 * | 3/2012 | Harber | A41F 9/002 | 2/338 |
| 2013/0015977 A1 * | 1/2013 | Scott | F41A 33/02 | 340/600 |
| 2013/0170038 A1 * | 7/2013 | Sheng | D04C 1/02 | 359/516 |
| 2013/0291887 A1 * | 11/2013 | Passarello | A45D 8/36 | 132/275 |
| 2014/0098523 A1 * | 4/2014 | Sutton | A41F 9/00 | 362/103 |
| 2014/0259269 A1 * | 9/2014 | Clements | A41D 13/01 | 2/69 |
| 2015/0116988 A1 * | 4/2015 | Uriarte | G08B 5/004 | 362/108 |
| 2016/0037840 A1 * | 2/2016 | Basik | A41D 20/00 | 2/170 |
| 2016/0088890 A1 * | 3/2016 | Armagh | A42B 1/242 | 362/105 |
| 2016/0120734 A1 * | 5/2016 | Ishikawa | A45F 3/04 | 601/151 |
| 2016/0123572 A1 * | 5/2016 | Mohadjeri | F21V 33/0004 | 362/108 |
| 2017/0114963 A1 * | 4/2017 | Villalobos | F21V 33/0008 | |
| 2018/0100646 A1 * | 4/2018 | Sullivan | F21S 9/02 | |
| 2018/0132555 A1 * | 5/2018 | Gonzalez | F21V 33/0008 | |
| 2018/0137749 A1 * | 5/2018 | Varga | G08B 21/0469 | |
| 2018/0266660 A1 * | 9/2018 | Cheng | A43C 9/00 | |
| 2018/0271197 A1 * | 9/2018 | Lane, II | F21L 4/02 | |
| 2019/0373964 A1 * | 12/2019 | Vann, Jr. | A41D 13/088 | |
| 2020/0205496 A1 * | 7/2020 | Buell | A41F 9/002 | |
| 2020/0297052 A1 * | 9/2020 | Olivares Velasco | A41D 13/015 | |
| 2021/0137182 A1 * | 5/2021 | Kalata | A41D 13/01 | |

FOREIGN PATENT DOCUMENTS

| | | | |
|---|---|---|---|
| CN | 204734556 U | * | 11/2015 |
| CN | 207354549 U | * | 5/2018 |
| KR | 20110002220 U | * | 3/2011 |

(56) References Cited

FOREIGN PATENT DOCUMENTS

| KR | 20200139932 A | * | 12/2020 | | |
| --- | --- | --- | --- | --- | --- |
| WO | WO-2007081997 A2 | * | 7/2007 | ............... | A42B 3/04 |
| WO | WO-2016037230 A1 | * | 3/2016 | ............. | A42B 3/105 |

OTHER PUBLICATIONS

Tyson and Cally, "Polar Trex Dog Boots by Ruffwear [Review]", Mar. 14, 2017, Adventure Righ, YouTube, https://www.youtube.com/watch?v=JcOfVsTBjTM, Video and pp. 1-2. (Year: 2017).*

Ruffwear, "New Products Explored—Polar Trex™ Dog Boots", Sep. 30, 2016, Ruffwear Explored, https://blog.ruffwear.com/2016/09/30/new-products-explored-polar-trex-dog-boots/, pp. 1-8. (Year: 2016).*

Ruffwear, "Choosing the Right Boots", Oct. 18, 2017, Ruffwear Explored https://blog.ruffwear.com/2017/10/18/choosing-the-right-boots/, pp. 1-5. (Year: 2017).*

* cited by examiner

PEDESTRIAN REFLECTIVE KIT

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to reflective kits and more particularly pertains to a new reflective kit for enhancing visibility of a pedestrian at night.

(2) Description of Related Art Including Information Disclosed Under 37 CFR 1.97 and 1.98

The prior art relates to reflective kits.

BRIEF SUMMARY OF THE INVENTION

An embodiment of the disclosure meets the needs presented above by generally comprising a waist belt that is wearable around a user's waist. The waist belt is extended through the sleeve and the sleeve is comprised of a light reflecting material to enhance visibility of the user in a darkened environment. A head band is wearable around the user's head. A pair of arm sleeves is provided and each of the arm sleeves is wearable around a respective one of the user's arms. Each of the arm sleeves is comprised of a light reflecting material to enhance visibility of the user in the darkened environment. A pair of ankle bracelets is each of the ankle bracelets is wearable around a respective one of the user's ankles. Each of the ankle bracelets is comprised of a light reflecting material to enhance visibility of the user in the darkened environment.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
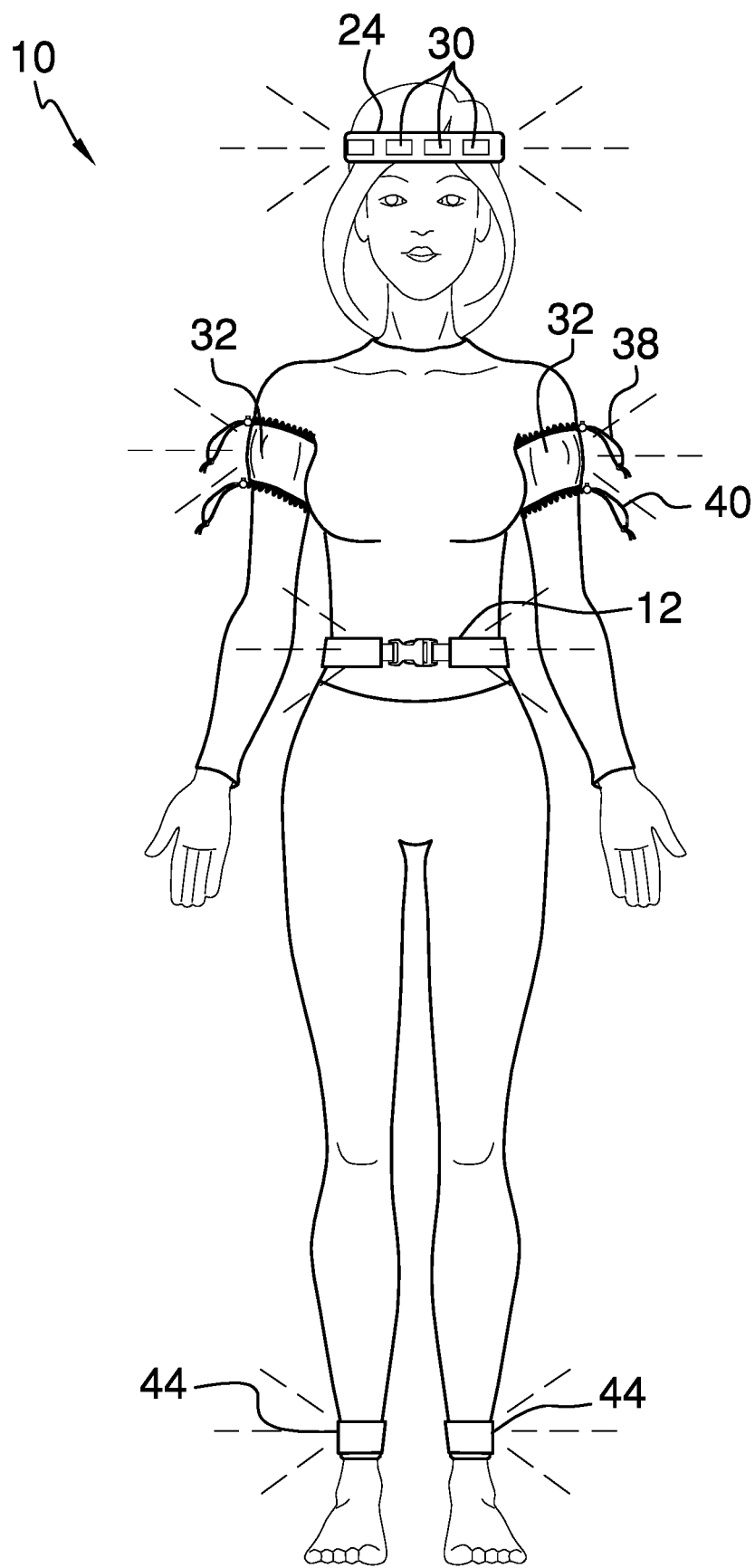
FIG. 1 is a perspective in-use view of a pedestrian reflective kit according to an embodiment of the disclosure.
Figure 2:
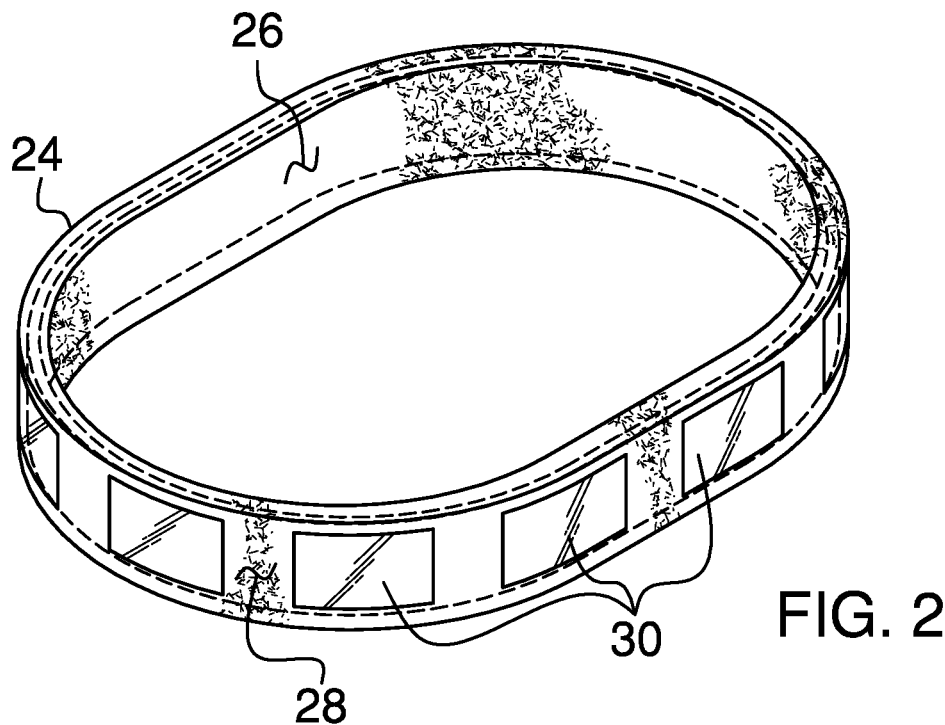
FIG. 2 is a perspective phantom view of head band of an embodiment of the disclosure.
Figure 3:
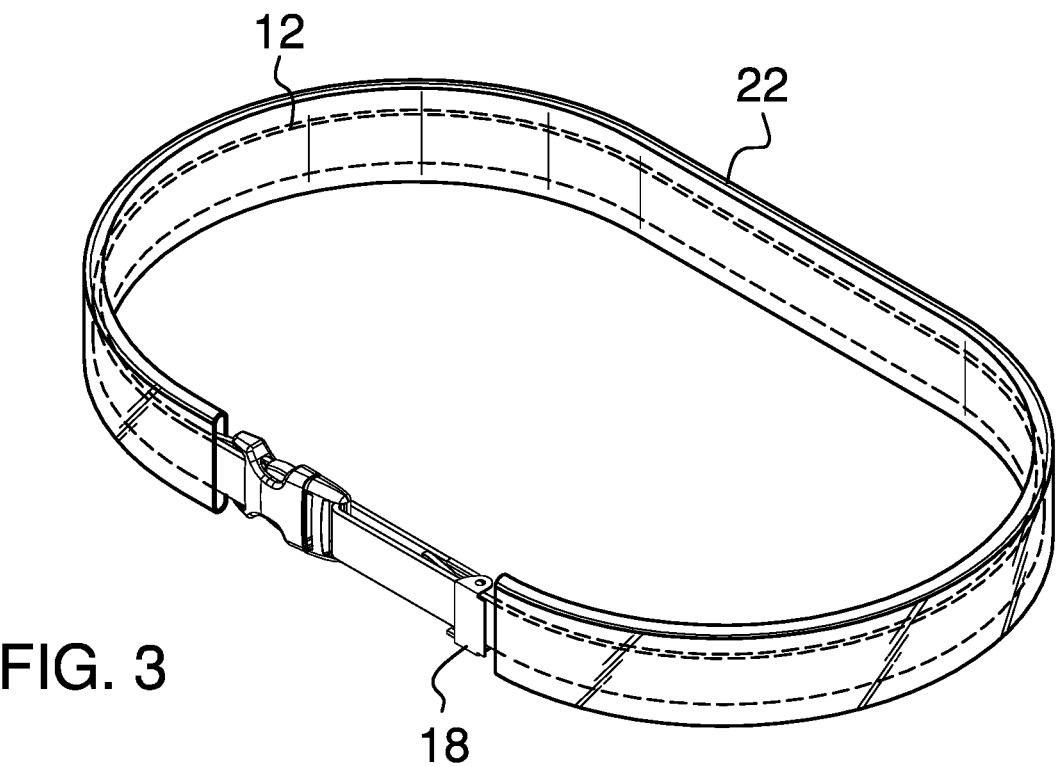
FIG. 3 is a perspective phantom view of a waist band of an embodiment of the disclosure.
Figure 4:
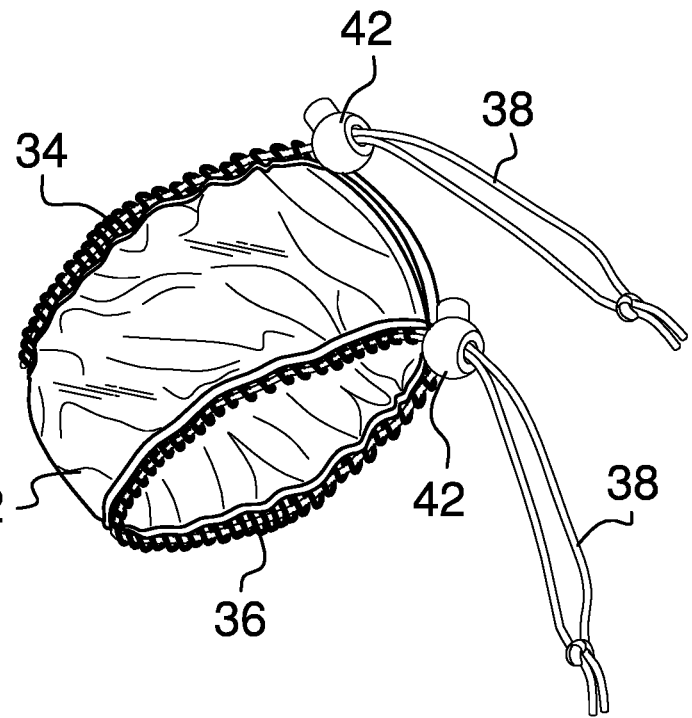
FIG. 4 is a perspective view of an arm sleeve of an embodiment of the disclosure.

With reference now to the drawings, and in particular to FIGS. 1 through 8 thereof, a new reflective kit embodying the principles and concepts of an embodiment of the disclosure and generally designated by the reference numeral 10 will be described.

As best illustrated in FIGS. 1 through 8, the pedestrian reflective kit 10 generally comprises a waist belt 12 that is wearable around a user's waist. The waist belt 12 is comprised of a resiliently stretchable material, and the waist belt 12 has a first end 14 and a second end 16. The first end 14 is matable to the second end 16 such that the waist belt 12 forms a closed loop. The waist belt 12 may include an adjustment slide 18 that is positioned adjacent to the second end 16 of the waist belt 12 for adjusting the length of the waist belt 12.

A pair of buckles 20 may each be coupled to a respective one of the first end 14 and the second end 16. The buckles 20 may releasably engage each other for closing the waist belt 12 around the user's waist. A sleeve 22 is provided and the waist belt 12 is extended through the sleeve 22. The sleeve 22 is comprised of a light reflecting material to enhance visibility of the user in a darkened environment.

A head band 24 is provided that is wearable around the user's head. The head band 24 is comprised of a resiliently stretchable material for enhancing fitment of the head band 24 on the user's head. The head band 24 has an inwardly facing surface 26 and an outwardly facing surface 28. The inwardly facing surface 26 comprises a fluid absorbent material for absorbing sweat on the user's head. The fluid absorbent material may be terry cloth, cotton textile or any other similar material that is comfortable for contact with human skin.

A plurality of reflective panels 30 is provided and each of the reflective panels 30 is coupled to the head band 24. Each of the reflective panels 30 is comprised of a light reflecting material to enhance visibility of the user in the darkened environment. Each of the reflective panels 30 is positioned on the outwardly facing surface 28 of the head band 24. Moreover, the reflective panels 30 are spaced apart from each other and are distributed around an entire circumference of the head band 24.

A pair of arm sleeves 32 is provided and each of the arm sleeves 32 is wearable around a respective one of the user's arms. Each of the arm sleeves 32 is comprised of a light reflecting material to enhance visibility of the user in the darkened environment. Each of the arm sleeves 32 has a top edge 34 and a bottom edge 36. Each of the arm sleeves 32 is comprised of a deformable material for enhancing comfort of the arm sleeves 32.

Each of the arm sleeves 32 includes a first drawstring 38 and a second drawstring 40. Each of the first drawstring 38 and the second drawstring 40 is aligned with a respective one of the top edge 34 and the bottom edge 36. The first drawstring 38 tightens the top edge 34 of the arm sleeve 32 around the user's arm. The second drawstring 40 tightens the bottom edge 36 of the arm sleeve 32 around the user's arm. Each of the first drawstring 38 and the second drawstring 40 includes a closure 42 for retaining the first drawstring 38 and the second drawstring 40 at a desired tightness.

A pair of ankle bracelets 44 is each wearable around a respective one of the user's ankles. Each of the ankle bracelets 44 is comprised of a light reflecting material to enhance visibility of the user in the darkened environment. Each of the ankle bracelets 44 has a primary end 46, a secondary end 48 and a first surface 50 extending therebetween. Each of the ankle bracelets 44 includes a buckle 52 that is attached to the primary end 46. The secondary end 48 is extendable through the buckle 52 to form a closed loop around the user's ankle. Moreover, each of the ankle bracelets 44 is matable to themselves for retaining the ankle bracelets 44 around the user's ankles.

Figure 5:
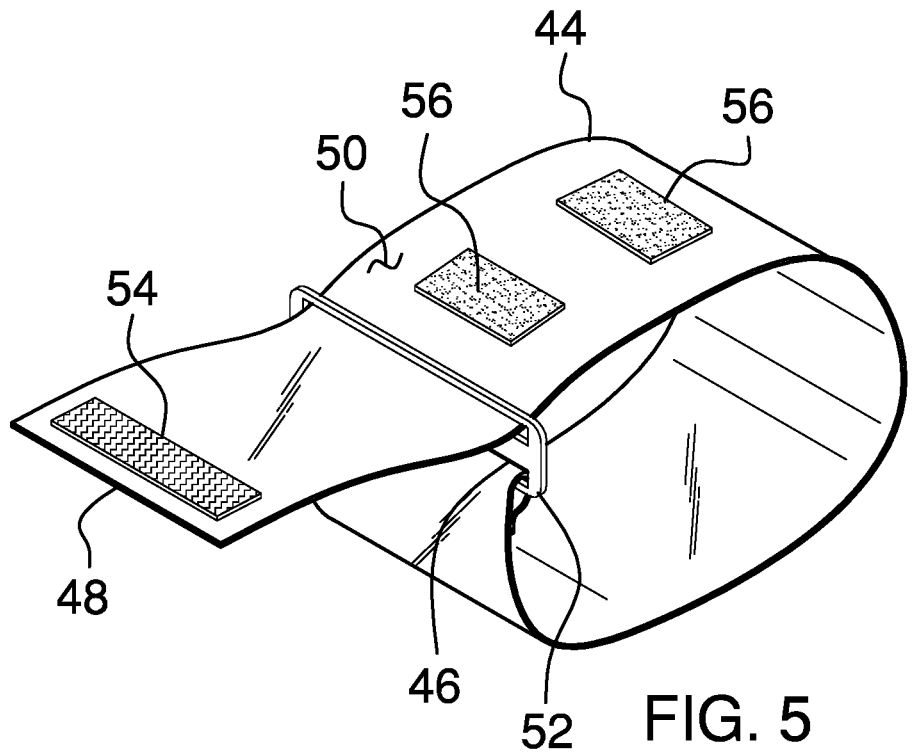
FIG. 5 is a perspective view of an ankle bracelet of an embodiment of the disclosure.
Figure 6:
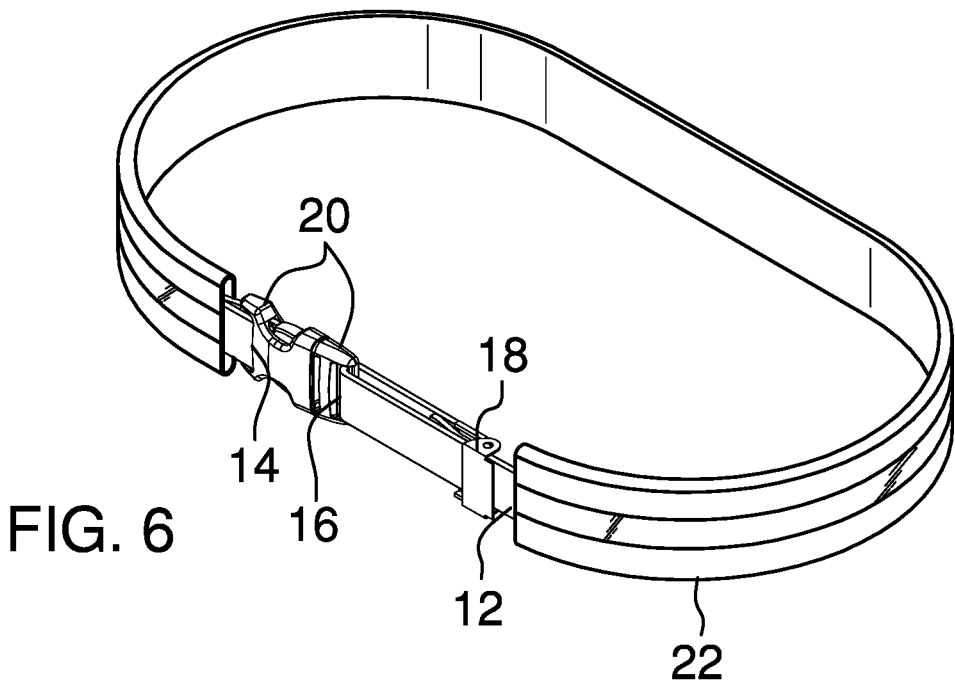
FIG. 6 is a perspective view of a waist belt of an embodiment of the disclosure.
Figure 7:
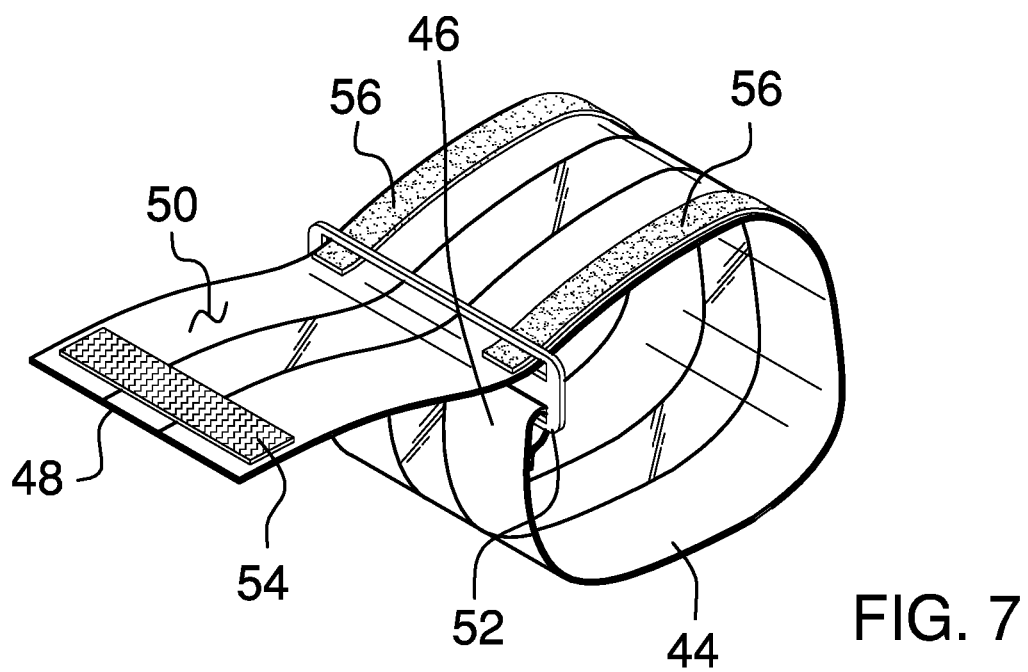
FIG. 7 is a top perspective view of an ankle bracelet of an embodiment of the disclosure.

As is most clearly shown in FIG. 5, a first mating member 54 may be coupled to the first surface 50 of each of the ankle bracelets 44. A plurality of second mating members 56 may be coupled to the first surface 50 of the ankle bracelets 44. The first mating member 54 may releasably engage a respective one of the second mating members 56 for mating the ankle bracelets 44 to themselves. Additionally, each of the first mating member 54 and the second mating members 56 may comprise hook and loop fasteners. As is most clearly shown in FIG. 7, the second mating members 56 may be elongated to extend along a substantial length of the ankle bracelets 44.

Figure 8:
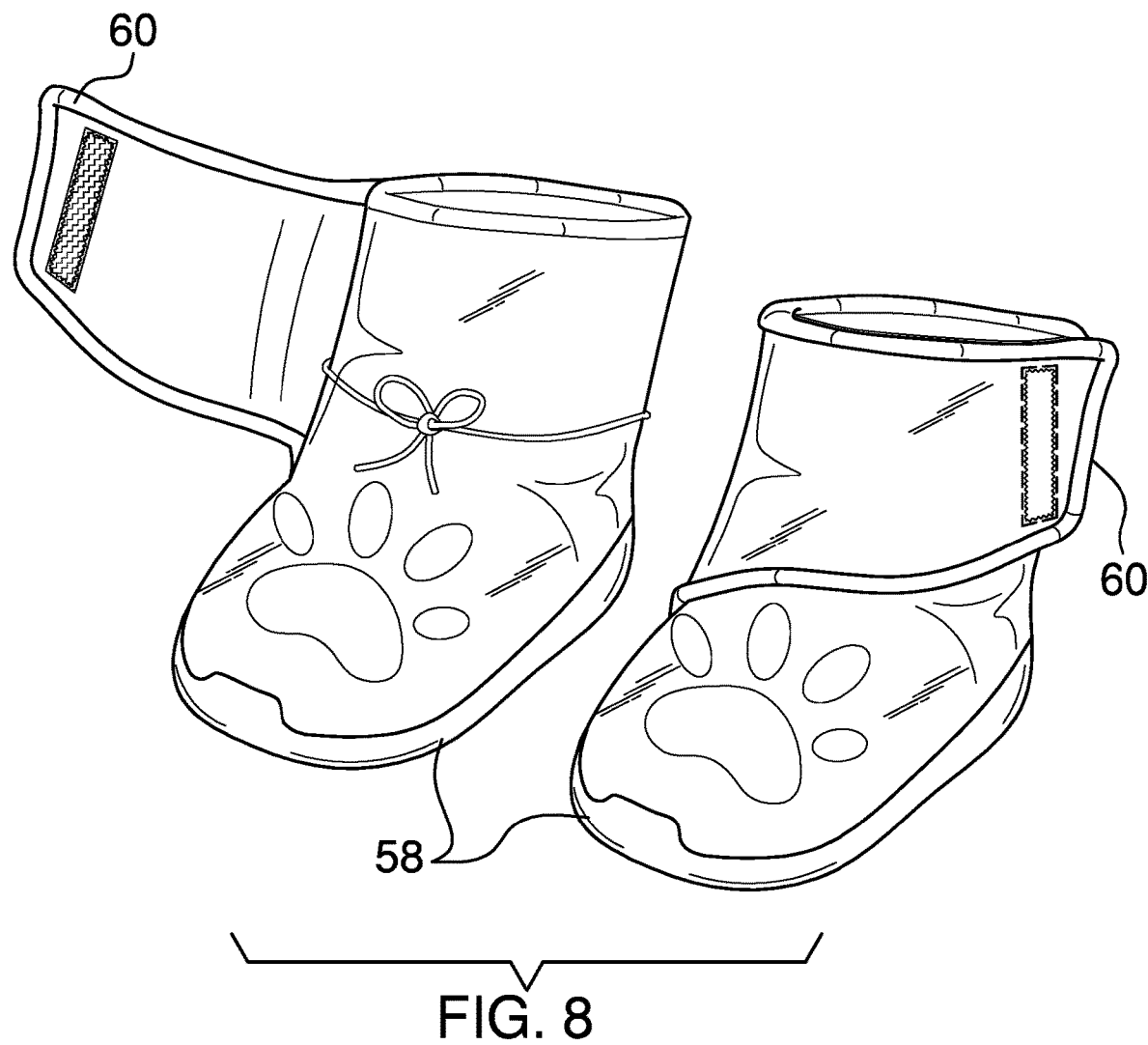
FIG. 8 is a perspective view of a plurality of boots of an embodiment of the disclosure.

As is most clearly shown in FIG. 8, a plurality of boots 58 may be provided and each of the boots 58 is wearable on paws of an animal. The animal may be a dog, a cat or any other domesticated animal. Each of the boots 58 is comprised of a light reflecting material to enhance visibility of the animal in the darkened environment. Each of the boots 58 has a closure 60 that is drawable across the boots 58 for tightening the boots 58 on the animal's paws.

In use, the user wears the waist belt 12, the head band 24, each of the arm sleeves 32 and each of the ankle bracelets 44 when the user walking, or performing any activity, outdoors during night time. In this way the waist belt 12, head band 24, each of the arm sleeves 32 and each of the ankle bracelets 44 enhance visibility of the user with respect to oncoming traffic when the user is walking near a roadway. Thus, the likelihood that the user will be inadvertently struck by oncoming traffic is reduced. The boots 58 can be worn on the animal's paws when the animal is being walked at night for enhancing visibility of the animal.

With respect to the above description then, it is to be realized that the optimum dimensional relationships for the parts of an embodiment enabled by the disclosure, to include variations in size, materials, shape, form, function and manner of operation, kit and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pedestrian reflective kit being configured to be worn by a user thereby facilitating the user to be visible to oncoming traffic, said kit comprising:

a waist belt being wearable around the user's waist, said waist belt being comprised of a resiliently stretchable material;

a sleeve having said waist belt being extended therethrough, said sleeve being comprised of a light reflecting material, wherein said sleeve is configured to enhance visibility of the user in a darkened environment;

a head band being wearable around the user's head, said head band being comprised of a resiliently stretchable material for enhancing fitment of said head band on the user's head;

a pair of arm sleeves, each of said arm sleeves being wearable around a respective one of the user's arms, each of said arm sleeves being comprised of a light reflecting material, wherein each of said arm sleeves is configured to enhance visibility of the user in the darkened environment;

a pair of ankle bracelets, each of said ankle bracelets being wearable around a respective one of the user's ankles, each of said ankle bracelets being comprised of a light reflecting material wherein each of said ankle bracelets is configured to enhance visibility of the user in the darkened environment;

said head band having an inwardly facing surface and an outwardly facing surface, said inwardly facing surface comprising a fluid absorbent material for absorbing sweat on the user's head;

a plurality of reflective panels, each of said reflective panels being coupled to said head band, each of said reflective panels being comprised of a light reflecting material wherein said head band is configured to enhance visibility of the user in the darkened environment, each of said reflective panels being positioned on said outwardly facing surface of said head band, said reflective panels being laterally spaced apart from each other and being distributed around an entire circumference of said head band, and wherein each of said arm sleeves has a top edge and a bottom edge, each of said arm sleeves including a first drawstring and a second drawstring, the first drawstring being aligned with the top edge and the second drawstring being aligned with the bottom edge, said first drawstring configured to tighten said top edge of said arm sleeve around the user's arm, said second drawstring configured to tighten said bottom edge of said arm sleeve around the user's arm, each of said first drawstring and said second drawstring including a closure for retaining said first drawing and said second drawstring at a desired tightness.

2. The kit according to claim 1, wherein each of said ankle bracelets has a primary end, a secondary end and a first surface extending therebetween, each of said ankle bracelets including a buckle being attached to said primary end, said secondary end being extendable through said buckle to form a closed loop around the user's ankle, each of said ankle bracelets being matable to themselves for retaining said ankle bracelets around the user's ankles.

3. A pedestrian reflective kit being configured to be worn by a user thereby facilitating the user to be visible to oncoming traffic, said kit comprising:

a waist belt being wearable around the user's waist, said waist belt being comprised of a resiliently stretchable material, said waist belt having a first end and a second end, said first end being matable to said second end such that said waist belt forms a closed loop;

a sleeve having said waist belt being extended therethrough, said sleeve being comprised of a light reflecting material wherein said sleeve is configured to enhance visibility of the user in a darkened environment;

a head band being wearable around the user's head, said head band being comprised of a resiliently stretchable material for enhancing fitment of said head band on the user's head, said head band having an inwardly facing surface and an outwardly facing surface, said inwardly facing surface comprising a fluid absorbent material for absorbing sweat on the user's head;

a plurality of reflective panels, each of said reflective panels being coupled to said head band, each of said reflective panels being comprised of a light reflecting material wherein said head band is configured to enhance visibility of the user in the darkened environment, each of said reflective panels being positioned on said outwardly facing surface of said head band, said reflective panels being laterally spaced apart from each other and being distributed around an entire circumference of said head band;

a pair of arm sleeves, each of said arm sleeves being wearable around a respective one of the user's arms, each of said arm sleeves being comprised of a light reflecting material wherein each of said arm sleeves is configured to enhance visibility of the user in the darkened environment, each of said arm sleeves having a top edge and a bottom edge, each of said arm sleeves including a first drawstring and a second drawstring, the first drawstring being aligned with the top edge and the second drawstring being aligned with the bottom edge, said first drawstring configured to tighten said top edge of said an sleeve around the user's arm, said second drawstring configured to tighten said bottom edge of said arm sleeve around the user's arm, each of said first drawstring and said second drawstring including a closure for retaining said first drawing and said second drawstring at a desired tightness; and a pair of ankle bracelets, each of said ankle bracelets being wearable around a respective one of the user's ankles, each of said ankle bracelets being comprised of a light reflecting material wherein each of said ankle bracelets is configured to enhance visibility of the user in the darkened environment, each of said ankle bracelets having a primary end, a secondary end and a first surface extending therebetween, each of said ankle bracelets including a buckle being attached to said primary end, said secondary end being extendable through said buckle to form a closed loop around the user's ankle, each of said ankle bracelets being matable to themselves for retaining said ankle bracelets around the user's ankles.

4. The kit according to claim 3, further comprising a plurality of boots, each of said boots being wearable on paws of an animal, each of said boots being comprised of a light reflecting material wherein said plurality of boots is configured to enhance visibility of the animal, each of said boots having a closure being drawable across said boots for tightening said boots on the animal's paws.

* * * * *